(12) United States Patent
Xu et al.

(10) Patent No.: US 12,162,427 B2
(45) Date of Patent: Dec. 10, 2024

(54) SYSTEM AND METHOD FOR IMPROVING SAFETY OF OCCUPANT BY VEHICLE SEAT BELT

(71) Applicant: ZF Automotive Technologies (Shanghai) Co., Ltd, Shanghai (CN)

(72) Inventors: Zihong Xu, Shanghai (CN); Sen Lin, Shanghai (CN); Ting Chen, Shanghai (CN); Yuanyi Cheng, Shanghai (CN)

(73) Assignee: ZF Automotive Technologies (Shanghai) Co., Ltd., Shanghai (CN)

( * ) Notice: Subject to any disclaimer, the term of this patent is extended or adjusted under 35 U.S.C. 154(b) by 254 days.

(21) Appl. No.: 17/917,966

(22) PCT Filed: Apr. 9, 2021

(86) PCT No.: PCT/CN2021/086053
§ 371 (c)(1),
(2) Date: Oct. 10, 2022

(87) PCT Pub. No.: WO2021/204229
PCT Pub. Date: Oct. 14, 2021

(65) Prior Publication Data
US 2023/0131504 A1    Apr. 27, 2023

(30) Foreign Application Priority Data

Apr. 10, 2020    (CN) .......................... 202010277531.0

(51) Int. Cl.
*B60R 22/48*    (2006.01)
*B60N 2/00*    (2006.01)
(Continued)

(52) U.S. Cl.
CPC .............. *B60R 22/48* (2013.01); *B60N 2/002* (2013.01); *B60R 21/0132* (2013.01);
(Continued)

(58) Field of Classification Search
CPC . B60R 22/48; B60R 21/0132; B60R 21/0134; B60R 22/20; B60R 22/44;
(Continued)

(56) References Cited

U.S. PATENT DOCUMENTS 5,415,431 A * 5/1995 Omura ................ B60R 21/0155
                                                  297/480
6,406,059 B1 * 6/2002 Taubenberger ......... B60R 21/18
                                                  280/808
(Continued)

FOREIGN PATENT DOCUMENTS

CN    102910140 A    2/2013
CN    104724029 A    6/2015
(Continued)

OTHER PUBLICATIONS

International Search Report and Written Opinion for PCT/CN2021/086053 mailed Jul. 15, 2021 (9 pages; with English translation).

*Primary Examiner* — Behrang Badii
(74) *Attorney, Agent, or Firm* — Kristin L. Murphy

(57) ABSTRACT

A system for improving safety of an occupant by a vehicle seat belt, which can provide adaptive protection for an occupant in different seat positions and different sitting postures is provided. A method for improving safety of an occupant by a vehicle seat belt is also provided, along with a computer-readable medium. The a system for improving safety of an occupant by a vehicle seat belt includes an in-vehicle observation system, an active seat belt system, and an integrated safety domain control unit. The integrated safety domain control unit formulates a vehicle seat belt protection strategy based on received data from the in-vehicle observation system, and a slack state of an active retractor and a positional state of an active lift buckle in the active seat belt system, to implement selective tightening or
(Continued)

loosening of the active retractor and/or selective lifting or lowering of the active lift buckle.

20 Claims, 5 Drawing Sheets

(51) Int. Cl.
　　*B60R 21/0132*　　(2006.01)
　　*B60R 21/0134*　　(2006.01)
　　*B60R 22/20*　　(2006.01)
　　*B60R 22/44*　　(2006.01)
　　*B60R 22/46*　　(2006.01)

(52) U.S. Cl.
　　CPC .......... *B60R 21/0134* (2013.01); *B60R 22/20* (2013.01); *B60R 22/44* (2013.01); *B60R 22/46* (2013.01); *B60R 2022/208* (2013.01); *B60R 2022/4666* (2013.01); *B60R 2022/4685* (2013.01)

(58) Field of Classification Search
　　CPC .............. B60R 22/46; B60R 2022/208; B60R 2022/4666; B60R 2022/4685; B60N 2/002; B60N 2210/24; B60N 2/0022; B60N 2/0027; B60N 2210/20; B60N 2210/26; B60W 40/08
　　See application file for complete search history.

(56) References Cited

U.S. PATENT DOCUMENTS

| | | | | |
|---|---|---|---|---|
| 2004/0195819 | A1* | 10/2004 | Mather | .................. B60R 22/30 |
| | | | | 280/806 |
| 2008/0290644 | A1 | 11/2008 | Spahn et al. | |
| 2010/0201179 | A1* | 8/2010 | Yokote | .................. B21D 19/16 |
| | | | | 297/480 |
| 2010/0270414 | A1* | 10/2010 | Harada | .................. B60R 22/46 |
| | | | | 242/390.2 |
| 2015/0203069 | A1 | 7/2015 | Holka et al. | |

FOREIGN PATENT DOCUMENTS

| | | | |
|---|---|---|---|
| CN | 105035074 | A | 11/2015 |
| CN | 107776524 | A | 3/2018 |
| CN | 108082106 | A | 5/2018 |
| CN | 110217190 | A | 9/2019 |
| CN | 110304014 | A | 10/2019 |
| JP | 2005328963 | A | 12/2005 |
| KR | 20150011090 | A | 1/2015 |

\* cited by examiner

SYSTEM AND METHOD FOR IMPROVING SAFETY OF OCCUPANT BY VEHICLE SEAT BELT

CROSS-REFERENCE TO RELATED APPLICATIONS

This application is a national stage of International Application No. PCT/CN2021/086053, filed Apr. 9, 2021, the disclosure of which is incorporated herein by reference in its entirety, and which claimed priority to China Patent Application No. 202010277531.0, filed Apr. 10, 2020, the disclosure of which is incorporated herein by reference in its entirety.

TECHNICAL FIELD

The present disclosure relates to a system and method for improving safety of an occupant by a vehicle seat belt.

BACKGROUND

A vehicle seat belt is a safety device configured to restrain an occupant during a collision, and prevent a secondary collision between the occupant and a steering wheel and an instrument panel, etc. during a collision, or prevent death or injury occurred due to the occupant being ejected from the vehicle during a collision. At present, a vehicle seat belt has become a primary consideration for drivers and occupants, and it is also one of the most important performances of a vehicle. With the development of the vehicle industry, many solutions for an improvement in a vehicle seat belt have been derived.

The patent for invention with publication no. CN 102910140 A describes an adjustable vehicle seat belt buckle, which includes a buckle receiver, and a controller for respectively determining a seat belt wearing status and a vehicle running status and sending a control signal for lifting or lowering the seat belt buckle based on a determination result, to automatically implement the lifting and lowering of the seat belt buckle depending on the vehicle condition, thereby improving the operating comfort when the seat belt is worn.

However, the inventors have found that with the development of autonomous driving, a seat position and a sitting posture of an occupant will change greatly. Thus, there is an urgent need to provide a vehicle seat belt device to protect an occupant in different seat positions and different sitting postures.

SUMMARY

What is needed is to provide a system for improving safety of an occupant by a vehicle seat belt, which can provide adaptive protection for an occupant in different seat positions and different sitting postures.

What is also needed is to provide a method for improving safety of an occupant by a vehicle seat belt, which can provide adaptive protection for an occupant in different seat positions and different sitting postures.

Still another need is to provide a computer-readable medium, which can implement the method for improving safety of an occupant by a vehicle seat belt.

To address these needs a system for improving safety of an occupant by a vehicle seat belt includes:
an in-vehicle observation system configured to acquire in-vehicle occupant posture data and/or in-vehicle occupant body shape data and/or in-vehicle seat posture data and/or in-vehicle occupant mental state data;
an active seat belt system, which includes an active retractor and an active lift buckle; and
an integrated safety domain control unit configured to receive the data acquired by the in-vehicle observation system and monitor states of the active retractor and the active lift buckle, and to formulate a vehicle seat belt protection strategy based on at least one piece of the received data, a slack state of the active retractor, and a positional state of the active lift buckle,
where the vehicle seat belt protection strategy includes:
selectively tightening or loosening the active retractor based on the in-vehicle occupant posture data and/or the in-vehicle occupant body shape data and/or the in-vehicle seat posture data and the slack state and the positional state; and/or
selectively lifting or lowering the active lift buckle based on the in-vehicle occupant posture data and/or the in-vehicle occupant body shape data and/or the in-vehicle seat posture data and the slack state and the positional state.

In one or more exemplary implementations, the system further includes:
a collision prediction system, which includes:
a vehicle external information monitoring module configured to monitor an obstacle around a vehicle body;
a vehicle body posture monitoring module configured to monitor vehicle body motion and a vehicle body posture; and
the integrated safety domain control unit configured to calculate a collision probability and a collision moment between the vehicle body and the obstacle based on the vehicle external information monitoring module and the vehicle body posture monitoring module,
where the integrated safety domain control unit formulates the vehicle seat belt protection strategy prior to the collision moment.

In one or more exemplary implementations, the collision prediction system further includes an Internet-of-vehicles module, which provides external information of the vehicle body together with the vehicle external information monitoring module.

In one or more exemplary implementations, the integrated safety domain control unit provides a collision determination based on the in-vehicle occupant mental state data and the collision probability, and if a result of the collision determination indicates Yes, the integrated safety domain control unit formulates a reminder strategy based on the collision determination,
the reminder strategy including:
circularly pre-tightening and pre-loosening the active retractor, and/or
circularly pre-lifting and pre-lowering the active lift buckle.

In one or more implementations, the vehicle external information monitoring module includes one or a combination of a millimeter wave radar, an ultrasonic radar, a laser radar, and an external camera.

In one or more exemplary implementations, the vehicle body posture monitoring module includes a speed sensor, a yaw velocity sensor, and a steering wheel angle sensor,
where the speed sensor is configured to monitor the vehicle body motion, and the yaw velocity sensor and the steering wheel angle sensor are configured to monitor the vehicle body posture.

In one or more exemplary implementations, the integrated safety domain control unit includes a modeling unit and a calculation unit, where the modeling unit is configured to model the obstacle based on monitoring information from the vehicle external information monitoring module, and to model the vehicle body based on monitoring information from the vehicle body posture monitoring module: and the calculation unit is configured to calculate the collision probability based on modeling information.

In one or more exemplary implementations, the system further includes a cloud database and a simulation database, where the cloud database is configured to provide historical data of a vehicle collision, and the simulation database is configured to provide simulation data of the vehicle collision based on the modeling information; and the calculation unit calculates a relative speed and a collision overlap rate between the vehicle body and the obstacle during the collision based on the historical data and the simulation data.

In one or more exemplary implementations, the in-vehicle observation system includes an image acquisition unit and a state capture unit, where the image acquisition unit is configured to acquire the in-vehicle occupant posture data, the in-vehicle seat posture data, and the in-vehicle occupant body shape data; and the state capture unit is configured to capture the in-vehicle occupant mental state data.

In one or more exemplary implementations, the image acquisition unit is either or a combination of a 3D camera and a 2D camera.

In one or more exemplary implementations, the state capture unit is a camera and/or an in-vehicle radar.

In one or more exemplary implementations, the in-vehicle occupant posture data includes occupant torso position data and/or occupant joint position data.

In one or more exemplary implementations, the in-vehicle seat posture data includes either or a combination of seat position data and seat back angle data.

In one or more exemplary implementations, the mental state data includes either or a combination of occupant health state data and occupant facial data.

In one or more exemplary implementations, the system further includes a collision sensor, where the collision sensor is configured to monitor vehicle body collision information and vehicle body collision degree information and to transmit the information to the integrated safety domain control unit, and the integrated safety domain control unit loosens the active retractor and lifts the active lift buckle based on the received information in combination with the data acquired by the in-vehicle observation system.

In one or more exemplary implementations, the integrated safety domain control unit provides an occupant intention determination based on the data acquired by the in-vehicle observation system, and based on a result of the intention determination, the integrated safety domain control unit selectively tightens or loosens the active retractor, and/or selectively lifts or lowers the active lift buckle.

A method for improving safety of an occupant by a vehicle seat belt includes:

providing a vehicle with an active seat belt system, which includes an active retractor and an active lift buckle;

acquiring in-vehicle occupant posture data and/or in-vehicle occupant body shape data and/or in-vehicle seat posture data and/or in-vehicle occupant mental state data;

monitoring a slack state of the active retractor and a positional state of the active lift buckle; and formulating a vehicle seat belt protection strategy, which includes:

selectively tightening or loosening the active retractor based on the in-vehicle occupant posture data and/or the in-vehicle occupant body shape data and/or the in-vehicle seat posture data and the slack state and the positional state: and/or selectively lifting or lowering the active lift buckle based on the in-vehicle occupant posture data and/or the in-vehicle occupant body shape data and/or the in-vehicle seat posture data and the slack state and the positional state.

In one or more exemplary implementations, the method for improving safety of an occupant further includes:

monitoring an obstacle around a vehicle body:

acquiring vehicle body motion and a vehicle body state;

calculating a collision probability and a collision moment between the vehicle and the obstacle based on the obstacle around the vehicle body, the vehicle body motion, and the vehicle body state; and determining, based on the in-vehicle occupant mental state data, the collision probability, and the collision moment, whether the occupant is aware of a possibility of a collision, and if not, circularly pre-tightening and pre-loosening the active retractor, and/or circularly pre-lifting and pre-lowering the active lift buckle.

In one or more exemplary implementations, the method for improving safety of an occupant further includes:

providing an occupant intention determination based on the data acquired by an in-vehicle observation system; and based on a result of the occupant intention determination, selectively tightening or loosening the active retractor, and/or selectively lifting or lowering the active lift buckle.

A computer-readable medium having computer instructions stored thereon, is also disclosed herein where when the computer instructions are executed by a processor, the steps of the method for improving safety of an occupant by a vehicle seat belt of any one of the foregoing exemplary arrangements are implemented.

The beneficial effects of the present disclosure are as follows:

The in-vehicle observation system acquires the posture of an occupant, and then the integrated safety domain control unit adaptively formulates a protection strategy for the occupant, thereby improving the protection efficiency and protection effect of the active seat belt system.

BRIEF DESCRIPTION OF DRAWINGS

The above and other features, properties and advantages of the present disclosure will become more apparent from the following description taken in conjunction with the accompanying drawings and exemplary arrangements, in which.

DETAILED DESCRIPTION

Figure 1:
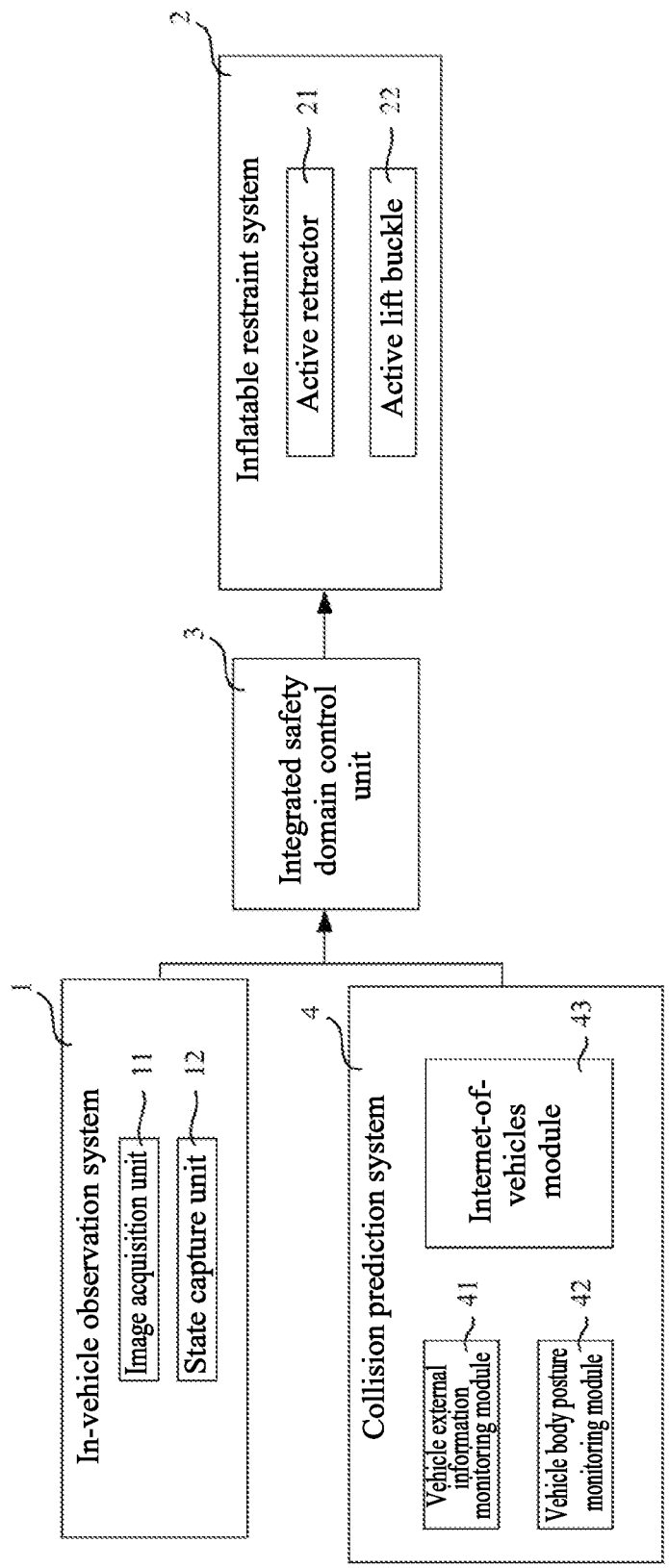
FIG. 1 is a schematic diagram of the present system in an exemplary implementation.

A variety of different implementations or exemplary arrangements for implementing the technical solutions of the described subject matter are disclosed below. In order to simplify the disclosure, specific instances of various elements and arrangements are described below, which are, of course, only examples and are not intended to limit the scope of protection of the present application. For example, a first feature described later in the specification being formed above or on a second feature may include an implementation in which the first feature is directly connected to the second feature, and may also include an implementation in which an additional feature is formed between the first feature and the second feature, such that the first feature may be not directly connected to the second feature. Additionally, reference numerals and/or letters may be repeated in various examples throughout the disclosure. The repetition is for brevity and clarity, and does not in itself represent a relationship between the exemplary implementations and/or structures to be discussed. Further, when a first element is described as being connected or combined with a second element, this indicates that it includes an exemplary implementation in which the first element and the second element are directly connected or combined with each other, and also includes an exemplary implementation in which the first element and the second element are indirectly connected or combined with each other by one or more other intervening elements.

Exemplary Arrangement 1

The following exemplary arrangement of the present system is understood with reference to FIG. 1. A system for improving safety of an occupant by a vehicle seat belt includes: an in-vehicle observation system 1, an active seat belt system 2, and an integrated safety domain control unit 3.

The in-vehicle observation system 1 is configured to acquire one or a combination of in-vehicle occupant posture data, in-vehicle occupant body shape data, in-vehicle seat posture data, and in-vehicle occupant mental state data.

The active seat belt system 2 includes an active retractor 21 and an active lift buckle 22.

The active retractor 21, as the name suggests, is an active control retractor device, which may be composed of a webbing, a webbing winding shaft, and a driving motor. The driving motor can drive the webbing to rotate around the shaft through a transmission mechanism such as a driving wheel, so as to tighten or loosen the webbing wound on the outer peripheral side of the webbing winding shaft.

The active lift buckle 22, as the name suggests, is an active control buckle device, which may include a buckle body, a buckle lifting part, and a driving motor, where the buckle body is used in cooperation with the active retractor 21. Specifically, a free end of the webbing in the active retractor 21 is provided with a buckle tongue, a buckle notch is provided on the buckle body, and after the buckle tongue is inserted into the buckle notch, a buckle pawl in the buckle notch restricts the buckle tongue from coming out of the buckle notch. The buckle lifting part can be drivingly connected to the driving motor through a transmission mechanism such as a worm gear transmission mechanism, so that the driving motor drives, when operating, the buckle lifting part to lift or lower, and thus drives the buckle body and the buckle tongue inserted into the buckle body to lift or lower.

The integrated safety domain control unit 3 is configured to receive the data acquired by the in-vehicle observation system 1 and also continuously monitor states of the active retractor 21 and the active lift buckle 22, and to formulate a vehicle seat belt protection strategy based on at least one piece of the received data, a slack state of the active retractor, and a positional state of the active lift buckle. The data received by the integrated safety domain control unit 3 may be one or a combination of the in-vehicle occupant posture data, the in-vehicle seat posture data, and the in-vehicle occupant mental state data.

The vehicle seat belt protection strategy includes: selectively tightening or loosening the active retractor 21 based on the in-vehicle occupant posture data and/or the in-vehicle occupant body shape data and/or the in-vehicle seat posture data and the slack state and the positional state, or selectively lifting or lowering the active lift buckle 22 based on the in-vehicle occupant posture data and/or the in-vehicle occupant body shape data and/or the in-vehicle seat posture data and the slack state and the positional state, or a combination of the two above. In one exemplary arrangement, the protection strategy may involve selectively tightening or loosening the active retractor 21 based on a seat position and/or a sitting posture of the occupant, the slack state, and the positional state, or selectively lifting or lowering the active lift buckle 22 based on a seat position and/or a sitting posture of the occupant, the slack state, and the positional state. Alternatively, in another exemplary implementation, the vehicle seat belt protection strategy may involve selectively tightening or loosening the active retractor 21 based on a seat position and/or a sitting posture of the occupant, the slack state, and the positional state, and selectively lifting or lowering the active lift buckle 22 based on a seat position and/or a sitting posture of the occupant, the slack state, and the positional state.

An exemplary arrangement of the vehicle seat belt protection strategy may be as follows. The in-vehicle observation system 1 acquires a distance between the occupant and a seat back as a first distance, and if the first distance is greater than a first threshold, it is determined that the occupant is in a first posture. In this case, the integrated safety domain control unit 3 formulates a protection strategy for the first posture, which involves selectively enabling the motor in the active retractor 21 to rotate by N1 turns in a first direction, so that the webbing in the active retractor 21 is retracted by L1 centimeters, to hold the occupant in the seat tightly.

Another exemplary arrangement of the vehicle seat belt protection strategy may be as follows. The in-vehicle observation system 1 acquires a distance between the occupant and a seat back as a second distance, and if the second distance is greater than a second threshold, it is determined that the occupant is in a second posture. In this case, the integrated safety domain control unit 3 formulates a protection strategy for the second posture, which involves selectively enabling the motor in the active lift buckle 22 to rotate by N2 turns in a first direction, so that the active lift buckle 22 is lowered by L2 centimeters, to hold the occupant in the seat tightly.

Still another exemplary arrangement of the vehicle seat belt protection strategy may be as follows. The in-vehicle observation system 1 acquires a distance between the occupant and a seat back as a third distance, and if the third distance is greater than a third threshold, it is determined that the occupant is in a third posture. In this case, the integrated safety domain control unit 3 formulates a protection strategy for the third posture, which involves selectively enabling the motor in the active retractor 21 to rotate by N3 turns in a second direction, so that the webbing in the active retractor 21 is retracted by L3 centimeters, and selectively enabling the motor in the active lift buckle 22 to rotate by N3 turns in a first direction, so that the active lift buckle 22 is lowered by L4 centimeters. The retraction of the webbing in the active retractor 21 and the lowering of the active lift buckle 22 allow for the occupant to be held in the seat tightly.

In addition, in-vehicle observation system 1 can also determine a left or right leaning of the occupant. If the occupant leans by more than a certain angle to the left or right, the occupant can also be held in the seat tightly by retracting the webbing and/or lifting or lowering the buckle.

It will be appreciated that the integrated safety domain control unit 3 as in the previous implementation may include one or a combination of one or more hardware processors, such as a system-on-chip (SOC), a microcontroller, a microprocessor (e.g., an MCU chip or a 51 single-chip microcomputer), a reduced instruction set computer (RISC), an application specific integrated circuit (ASIC), an application specific instruction integrated processor (ASIP), a central processing unit (CPU), a graphics processing unit (GPU), a physical processing unit (PPU), a microcontroller unit, a digital signal processor (DSP), a field programmable gate array (FPGA), an advanced RISC machine (ARM), a programmable logic device (PLD), any circuit or processor capable of performing one or more functions, etc.

The in-vehicle observation system 1 includes an image acquisition unit 11 and a state capture unit 12, where the image acquisition unit 11 is configured to acquire the in-vehicle occupant posture data, the in-vehicle seat posture data, and the in-vehicle occupant body shape data; and the state capture unit 12 is configured to capture the in-vehicle occupant mental state data. Specifically, the image acquisition unit 11 is either or a combination of a 3D camera and a 2D camera.

The in-vehicle occupant posture data that is acquired by the image acquisition unit 11 includes occupant torso position data and/or occupant joint position data.

The in-vehicle seat posture data that is acquired by the image acquisition unit 11 includes either or a combination of seat position data and seat back angle data.

Figure 2:
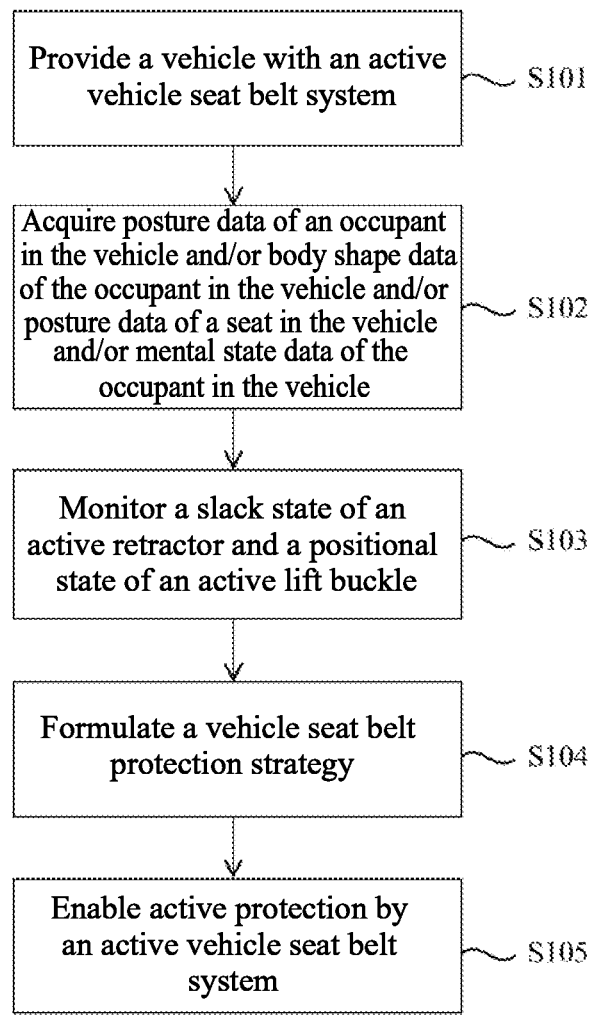
FIG. 2 is a schematic flowchart of a method for improving safety of an occupant by a vehicle seat belt in an exemplary implementation.

The method for improving safety of an occupant by a vehicle seat belt in Exemplary Arrangement 1 may be as shown in FIG. 2. The method includes the following steps:

S101: providing a vehicle with an active seat belt system, which includes an active retractor and an active lift buckle;

S102: acquiring in-vehicle occupant posture data and/or in-vehicle occupant body shape data and/or in-vehicle seat posture data and/or in-vehicle occupant mental state data;

S103: monitoring a slack state of the active retractor and a positional state of the active lift buckle:

S104: formulating a vehicle seat belt protection strategy, where the formulated protection strategy includes: selectively tightening or loosening the active retractor 21 based on the in-vehicle occupant posture data and/or the in-vehicle occupant body shape data and/or the in-vehicle seat posture data and the slack state and the positional state, and/or selectively lifting or lowering the active lift buckle 22 based on the in-vehicle occupant posture data and/or the in-vehicle occupant body shape data and/or the in-vehicle seat posture data and the slack state and the positional state;

and S105: enabling active protection by an active vehicle seat belt system.

In a future scenario of autonomous driving, an occupant is not always upright sitting in a seat, but usually leaning to the left, right or forward. In this case, the position of the occupant cannot be determined only by the position of the seat. The in-vehicle observation system 1 acquires the posture of the occupant, and then the integrated safety domain control unit 3 adaptively formulates a protection strategy for the occupant, thereby improving the protection efficiency and protection effect of the active seat belt system 2.

Exemplary Arrangement 2

In Exemplary Arrangement 2, the following system or modules may also be added to Exemplary Arrangement 1, and only the added part will be described below.

As shown in FIG. 1, the system for improving safety of an occupant by a vehicle seat belt further includes a collision prediction system 4. The collision prediction system includes a vehicle external information monitoring module 41 and a vehicle body posture monitoring module 42.

The vehicle external information monitoring module 41 is configured to monitor an obstacle around a vehicle body, and the vehicle body posture monitoring module 42 is configured to monitor vehicle body motion and a vehicle body posture.

The vehicle body posture monitoring module 42 includes a speed sensor, a yaw velocity sensor, and a steering wheel angle sensor, where the speed sensor is configured to monitor the vehicle body motion, and the yaw velocity sensor and the steering wheel angle sensor are configured to monitor the vehicle body posture.

Specifically, in some exemplary implementations, the vehicle external information monitoring module 41 includes one or a combination of a millimeter wave radar, an ultrasonic radar, a laser radar, and an external camera. The millimeter wave radar, the ultrasonic radar, and the laser radar are configured to locate an obstacle and acquire data, such as a speed, an angle, and a distance, of the obstacle. The millimeter wave radar is not susceptible to interference from weather and has a long detection range, and can monitor the obstacle in a long range. The laser radar is higher in terms of precision and simple in terms of data processing, and can complement the information acquired by millimeter wave radar in terms of data content and precision, so that a monitoring result is more accurate. The external camera is configured to acquire image information of the obstacle, for use in distinguishing and identification of the obstacle.

The integrated safety domain control unit 3 is configured to calculate a collision probability and a collision moment between the vehicle body and the obstacle, and a position of collision between the vehicle body and the obstacle based on the vehicle external information monitoring module 41 and the vehicle body posture monitoring module 42. In addition, the integrated safety domain control unit 3 receives the data acquired by the in-vehicle observation system 1, and formulates the protection strategy prior to the collision moment based on the received data. The data received by the integrated safety domain control unit 3 may be one or a combination of the in-vehicle occupant posture data, the in-vehicle seat posture data, and the in-vehicle occupant mental state data.

Specifically, in some exemplary implementations, the integrated safety domain control unit 3 may include a modeling unit and a calculation unit. The modeling unit models the obstacle and the vehicle body, respectively. Specifically, the modeling unit fuses the data acquired by the millimeter wave radar, the laser radar, and the external camera, to continuously model the obstacle in real time. In addition, the modeling unit continuously models the traveling vehicle body in real time based on vehicle body motion information monitored by the speed sensor, vehicle body yaw angular velocity information monitored by the yaw velocity sensor, and vehicle steering wheel angle information monitored by the steering wheel angle sensor.

The calculation unit compares obstacle modeling information and vehicle body modeling information, which are updated in real time, to calculate the collision probability and collision moment information. In the meantime, the calculation unit will update calculation results in real time during calculation, and continuously compare the calculation results with real-time observation results, to improve the calculation accuracy with reduced errors.

Figure 3:
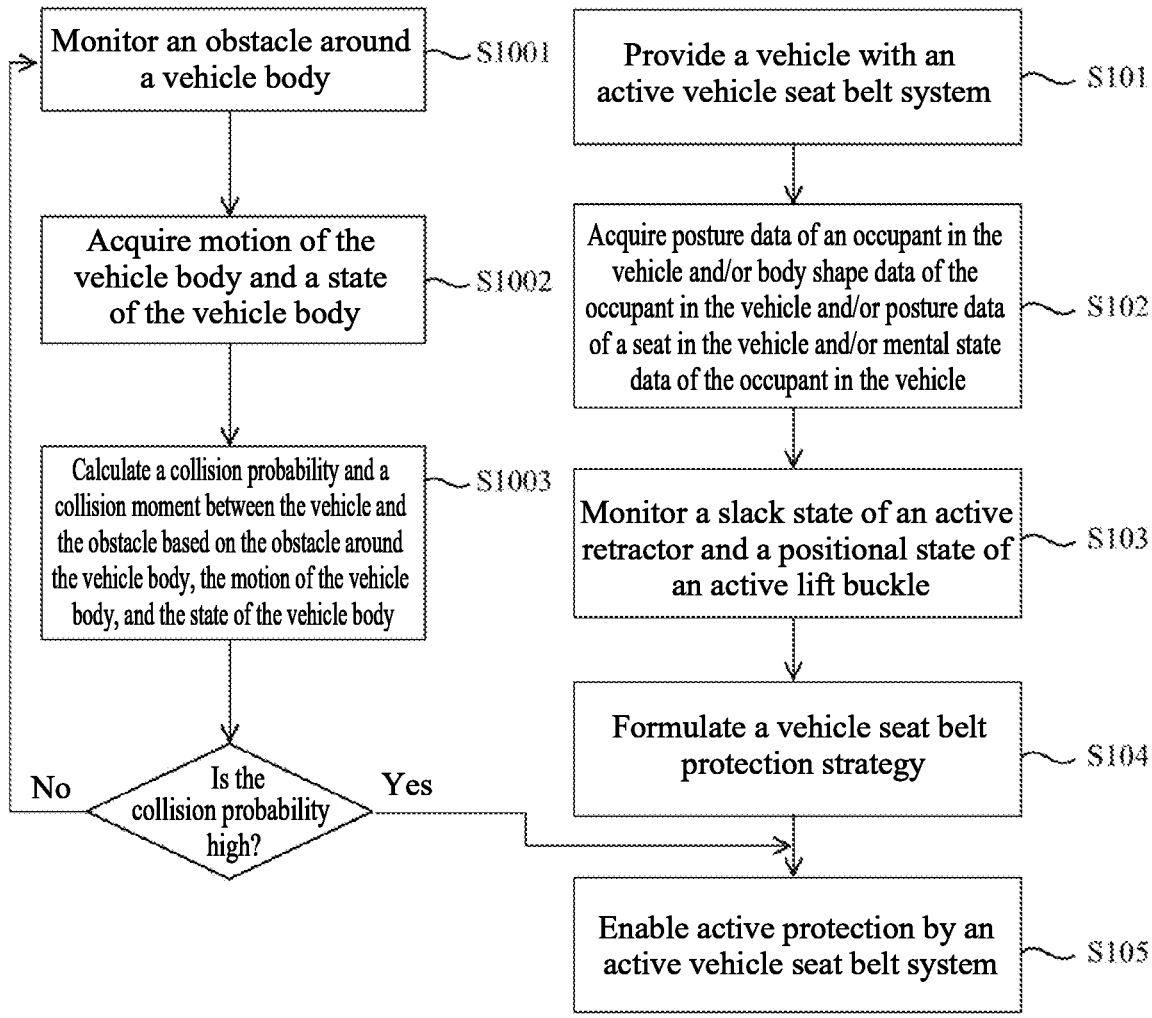
FIG. 3 is a schematic flowchart of a method for improving safety of an occupant by a vehicle seat belt in another exemplary implementation.

The method for improving safety of an occupant by a vehicle seat belt in Exemplary Arrangement 2 may be as shown in FIG. 3. In addition to the steps in FIG. 2, the method further includes the following steps:

S1001: monitoring an obstacle around a vehicle body;
S1002: acquiring vehicle body motion and a vehicle body state: and
S1003: calculating a collision probability and a collision moment between a vehicle and the obstacle based on the obstacle around the vehicle body, the vehicle body motion, and the vehicle body state.

If the collision probability is low, steps S1001 to S1003 are repeated. If the collision probability is high, the step S105 is performed: enabling active protection by an active vehicle seat belt system.

With the collision moment calculated, the integrated safety domain control unit 3 may formulate the protection strategy prior to the collision moment, such that when a collision occurs, the seat belt has been adaptively adjusted to hold the occupant in the seat tightly, which further improves the protective effect of the active seat belt system 2.

Exemplary Arrangement 3

In Exemplary Arrangement 3, the following system or modules may also be added to Exemplary Arrangement 2, and only the added part will be described below.

As shown in FIG. 1, the collision prediction system 4 further includes an Internet-of-vehicles module 43, which can provide distance information between vehicles through communication with other traveling vehicles and network systems. The Internet-of-vehicles module 43 can provide external information of the vehicle body together with the vehicle external information monitoring module 41, and the modeling unit continuously updates the modeling of the obstacle around the vehicle body in real time based on the external information of the vehicle body.

Exemplary Arrangement 4

In Exemplary Arrangement 4, the following system or modules may also be added to Exemplary Arrangement 2, and only the added part will be described below.

The integrated safety domain control unit 3 provides a collision determination based on the occupant mental state data and the collision probability. The collision determination includes: determining whether an occupant can be aware of a possibility of a collision. If the occupant can be aware of the possibility of the collision, a reminder strategy is formulated. The reminder strategy involves: circularly pre-tightening and pre-loosening the active retractor 21 and/or circularly pre-lifting and pre-lowering the active lift buckle 22.

In an exemplary arrangement, the state capture unit 12 for capturing the in-vehicle occupant mental state data is a camera and an in-vehicle radar, and the mental state data captured thereby may include either or a combination of occupant health state data and occupant facial data. Specifically, the health state data monitored by the camera may include heartbeat information, etc., and information about the facial data may include facial emotional state information (such as excitement, rage), facial fatigue state information (such as a blinking frequency, yawn), facial gaze information (such as where a camera tracks the gaze of a person to determine whether a driver has noticed the obstacle), and facial orientation information (such as where the head turning of the occupant is determined, based on a facial orientation, for analysis, to determine whether the person pays attention in front). The in-vehicle radar can function to implement in-vehicle live detection and heartbeat detection.

An exemplary arrangement of the reminder strategy may be as follows. When heartbeat data of the occupant that is captured by the state capture unit 12 is a first value and the blinking frequency of the occupant that is captured by the state capture unit is a second value, it is determined, based on information from a database, that the occupant is in a first mental state at this time and can be aware of the occurrence of the collision. In this case, no reminder strategy is formulated.

Another exemplary arrangement of the reminder strategy may be as follows. When heartbeat data of the occupant that is captured by the state capture unit 12 is a third value, the blinking frequency of the occupant that is captured by the state capture unit is a fourth value, and a facial gaze of the occupant that is captured by the state capture unit is away from a road surface for more than a first time, it is determined, based on information from a database, that the occupant is in a second mental state at this time and cannot be aware of the occurrence of the collision. In this case, the reminder strategy is formulated.

Figure 4:
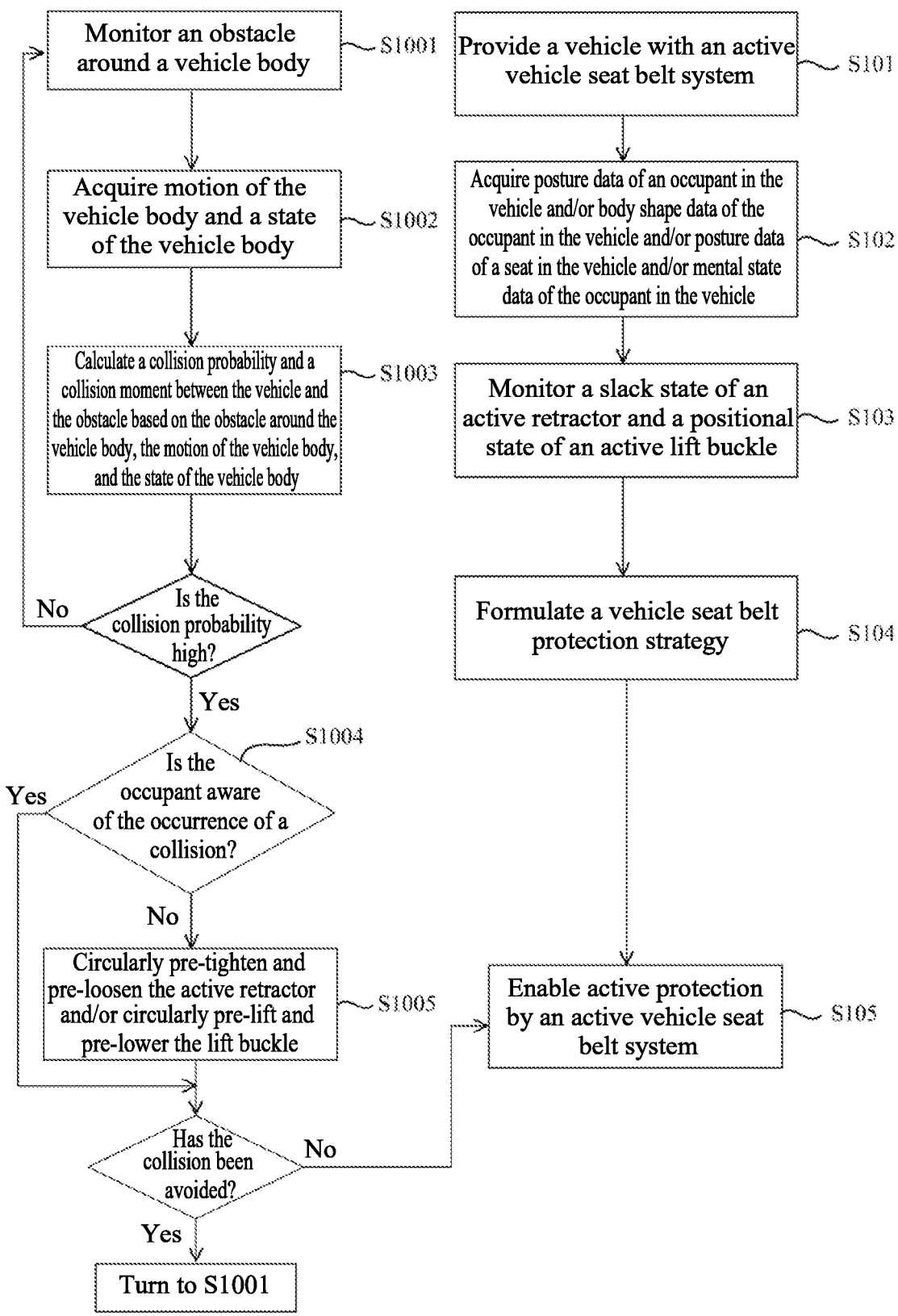
FIG. 4 is a schematic flowchart of a method for improving safety of an occupant by a vehicle seat belt in still another exemplary implementation.

The method for improving safety of an occupant by a vehicle seat belt in Exemplary Arrangement 4 may be as shown in FIG. 4. In addition to the steps shown in FIG. 3, the method further includes:

S1004: determining, based on the in-vehicle occupant mental state data, the collision probability, and the collision moment, whether the occupant is aware of a possibility of a collision, and if not, turning to step S1005, and if yes, turning to a determination step: determining whether a collision has occurred; and S1005: circularly pre-tightening and pre-loosening the active retractor and/or circularly pre-lifting and pre-lowering the lift buckle, to remind the occupant of the occurrence of the collision; and once S1005 is performed, making a subsequent determination as to whether the collision has been avoided, and if yes, turning to step S1001 to continue to monitor the obstacle around the vehicle body, and if not, turning to S105.

Exemplary Arrangement 5

In Exemplary Arrangement 5, the following system or modules may also be added to Exemplary Arrangement 1, and only the added part will be described below.

The system for improving safety of an occupant by a vehicle seat belt further includes a cloud database and a simulation database, where the cloud database is configured to provide historical data of a vehicle collision, and the simulation database is configured to provide simulation data of the vehicle collision based on the modeling information. The calculation unit calculates a relative speed and a collision overlap rate between the vehicle and the obstacle during the collision based on the historical data and the simulation data, to further calculate the collision probability. Specifically, a distance by which the vehicle has traveled in a certain period of time is S=VT, and a speed thereof is V=aT. If deceleration cannot bring the speed down to 0 within a corresponding time and distance, the collision probability can be considered high. In addition, it also takes time to turn the vehicle at a certain angle. If it is unable to sufficiently turn the vehicle at an angle within the corresponding time and distance, the collision cannot be avoided. The collision position and overlap rate of when a collision occurs can be calculated by calculating an angle at which the vehicle can be turned in a limited time.

An exemplary arrangement of calculating the collision probability may be as follows. The cloud database provides historical data of vehicle collisions as a first collision model, the simulation database is used to provide, based on the modeling information, simulation data of the vehicle collisions as a second collision model, and the calculation unit calculates, by fusing data information of the first collision model and the second collision model, the relative speed between the vehicle and the obstacle during the collision as a first speed and the collision overlap rate as a first overlap rate. In this case, the collision probability is calculated as a first probability based on the first speed and a first collision position.

Exemplary Arrangement 6

In Exemplary Arrangement 6, the following system or modules may also be added to Exemplary Arrangement 1, and only the added part will be described below.

The system for improving safety of an occupant by a vehicle seat belt further includes a collision sensor. The collision sensor may monitor vehicle body collision information of the vehicle body and vehicle body collision degree information, and transmit the information to the integrated safety domain control unit 3. Once the vehicle body collision sensor monitors that a collide has occurred to the vehicle body, the integrated safety domain control unit 3 then makes a determination based on the data acquired by the in-vehicle observation system 1. If the occupant have been protected and there is no secondary injury at this time, the active retractor 21 is loosened and the active lift buckle 22 is lifted, so that the occupant can disengage from the seat.

Exemplary Arrangement 7

In Exemplary Arrangement 7, the following system or modules may also be added to Exemplary Arrangement 1, and only the added part will be described below.

In the system for improving safety of an occupant by a vehicle seat belt, the integrated safety domain control unit 3 makes an occupant intention determination based on the data acquired by the in-vehicle observation system 1, and selectively tightens or loosens the active retractor 21 and/or selectively lifts or lowers the active lift buckle 22 based on a result of the intention determination. For details, reference may be made to the following exemplary arrangement.

A schematic exemplary arrangement of the occupant intention determination is as follows. The camera captures the occupant who extends his/her arm at an angle above a fourth angle value and turns his/her body backward at an angle above a fifth angle value. In this case, the integrated safety domain control unit 3 determines that the occupant has an intention of grasping an item in a rear direction at this time. In this case, the webbing in the active retractor 21 is loosened until no force is applied, such that the occupant can grasp the item.

Figure 5:
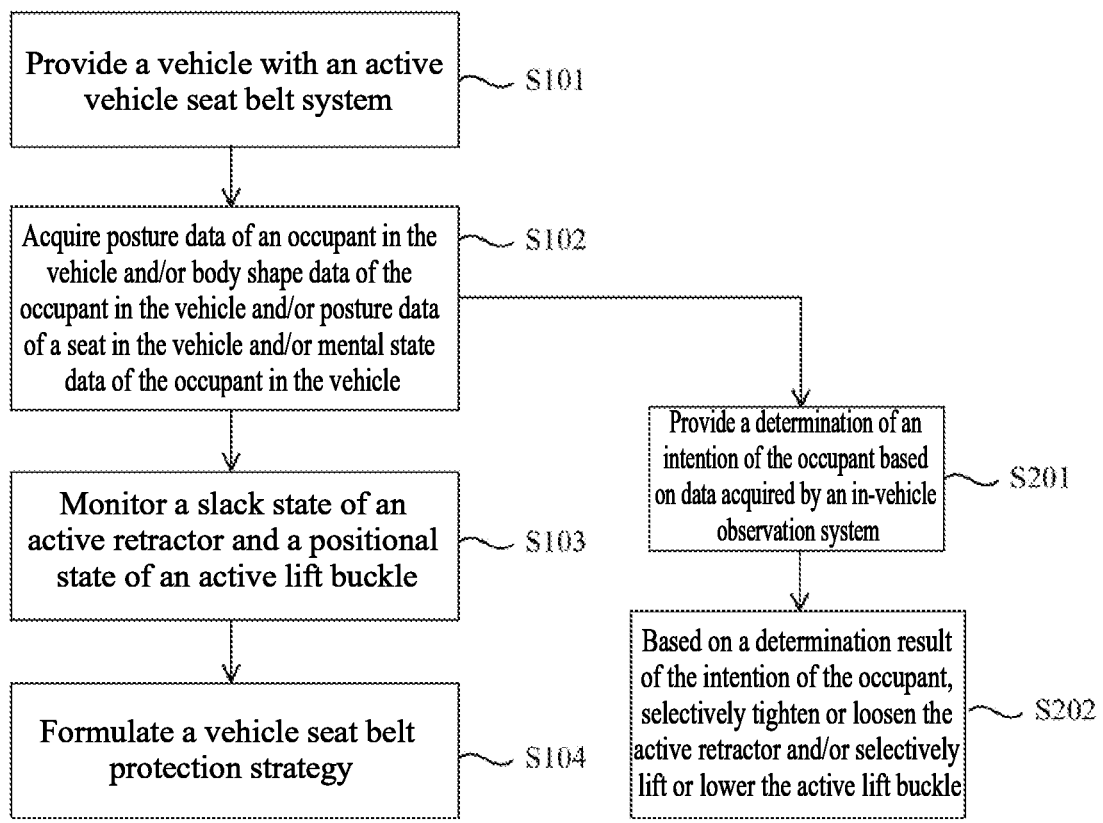
FIG. 5 is a schematic flowchart of a method for improving safety of an occupant by a vehicle seat belt in yet another exemplary implementation.

The method for improving safety of an occupant by a vehicle seat belt in Exemplary Arrangement 7 may be as shown in FIG. 5. In addition to the steps shown in FIG. 1, the method further includes:

S201: providing an occupant intention determination based on data acquired by an in-vehicle observation system; and S202: based on a result of the occupant intention determination, selectively tightening or loosening the active retractor and/or selectively lifting or lowering the active lift buckle.

The active retractor is tightened or loosened and/or the active lift buckle is lifted or lowered through analysis of the intention of the occupant, so that the occupant can complete the operation to grasp an item from the rear without the need to unbuckle the seat belt, thereby improving the convenience of use by the occupant, and also strengthening the protection of the occupant by the active seat belt system 2.

According to another aspect of the present disclosure, a computer-readable storage medium is further provided herein.

The above computer-readable storage medium provided in the present disclosure has computer instructions stored thereon. When the computer instructions are executed by a processor, the method for improving safety of an occupant by a vehicle seat belt provided in any one of the foregoing exemplary arrangements can be implemented, such that the active retractor 21 and the active lift buckle can cooperate with the in-vehicle observation system, and once a collision has occurred, the integrated safety domain control unit 3 can be used to adaptively formulate a protection strategy for the occupant, thereby improving the protection efficiency and protection effect of the active seat belt system 2.

The steps of the method or algorithm described in conjunction with the exemplary arrangements disclosed herein may be embodied directly in hardware, in a software module executed by a processor, or in a combination of the two. The software module may reside in a RAM memory, a flash memory, a ROM memory, an EPROM memory, an EEPROM memory, a register, a hard disk, a removable disk, a CD-ROM, or any other form of storage medium known in the art. An exemplary storage medium is coupled to a processor such that the processor can read and write information from/to the storage medium. In an alternative, the storage medium may be integrated into the processor. The processor and the storage medium may reside in an ASIC. The ASIC may reside in a user terminal. In an alternative, the processor and the storage medium may reside in the user terminal as discrete assemblies.

In one or more exemplary arrangements, the functions described may be implemented in hardware, software, firmware, or any combination thereof. If implemented as a computer program product in software, the functions may be stored on or transmitted over a computer-readable medium as one or more instructions or code. The computer-readable medium includes both a computer storage medium and a communication medium including any medium that facilitates transfer of a computer program from one place to another. The storage medium may be any available medium that can be accessed by a computer. By way of example, without limitation, such a computer-readable medium may include a RAM, a ROM, an EEPROM, a CD-ROM or other optical disk storage, magnetic disk storage or other magnetic storage devices, or any other media that can be used to carry or store suitable program code in the form of instructions or data structures and that can be accessed by a computer. Any connection is also properly termed a computer-readable medium. For example, if the software is transmitted from a web site, a server, or other remote sources using a coaxial cable, a fiber optic cable, a twisted pair, a digital subscriber line (DSL), or wireless technologies such as infrared, radio, and microwaves, the coaxial cable, the fiber optic cable, the twisted pair, the DSL, or the wireless technologies such as infrared, radio, and microwaves are included in the definition of the medium. The disk and disc as used herein include a compact disc (CD), a laser disc, an optical disc, a digital versatile disc (DVD), a floppy disk, and a blu-ray disc, where the disk is often used to magnetically reproduce data, and the disc is used to optically reproduce data by using laser light. A combination of the above should also be included within the range of then computer-readable medium.

Although the present disclosure is disclosed above with exemplary arrangements, the exemplary arrangements are not intended to limit the present disclosure. Any person skilled in the art can make possible changes and alterations without departing from the spirit and scope of the present disclosure. Therefore, any alteration, equivalent change and modification made to the above exemplary arrangements in accordance with the technical substance of the present disclosure without departing from the content of the technical solutions of the present disclosure shall fall within the scope of protection defined by the claims of the present disclosure.

The invention claimed is:

1. A system for improving safety of an occupant by a vehicle seat belt, comprising:
    an in-vehicle observation system configured to acquire in-vehicle occupant posture data and/or in-vehicle occupant body shape data and/or in-vehicle seat posture data and/or in-vehicle occupant mental state data;
    an active seat belt system, which comprises an active retractor and an active lift buckle; and
    an integrated safety domain control unit configured to receive the data acquired by the in-vehicle observation system and monitor states of the active retractor and the active lift buckle, and to formulate a vehicle seat belt protection strategy based on at least one piece of the received data, a slack state of the active retractor, and a positional state of the active lift buckle,
    wherein the vehicle seat belt protection strategy comprises:
    selectively tightening or loosening the active retractor based on the in-vehicle occupant posture data and/or the in-vehicle occupant body shape data and/or the in-vehicle seat posture data and the slack state and the positional state; and/or
    selectively lifting or lowering the active lift buckle based on the in-vehicle occupant posture data and/or the in-vehicle occupant body shape data and/or the in-vehicle seat posture data and the slack state and the positional state.

2. A system for improving safety of an occupant by a vehicle seat belt of claim 1, further comprising:
    a collision prediction system, which comprises:
    a vehicle external information monitoring module configured to monitor an obstacle around a vehicle body;
    a vehicle body posture monitoring module configured to monitor vehicle body motion and a vehicle body posture; and
    the integrated safety domain control unit configured to calculate a collision probability and a collision moment between the vehicle body and the obstacle based on the vehicle external information monitoring module and the vehicle body posture monitoring module,
    wherein the integrated safety domain control unit formulates the vehicle seat belt protection strategy prior to the collision moment.

3. A system for improving safety of an occupant by a vehicle seat belt of claim 2, wherein the collision prediction system further comprises an Internet-of-vehicles module, which provides external information of the vehicle body together with the vehicle external information monitoring module.

4. A system for improving safety of an occupant by a vehicle seat belt of claim 2, wherein the integrated safety domain control unit provides a collision determination based on the in-vehicle occupant mental state data and the collision probability, and if a result of the collision determination indicates Yes, the integrated safety domain control unit formulates a reminder strategy based on the collision determination,
    wherein the reminder strategy comprises:
    circularly pre-tightening and pre-loosening the active retractor; and/or
    circularly pre-lifting and pre-lowering the active lift buckle.

5. A system for improving safety of an occupant by a vehicle seat belt of claim 2, wherein the vehicle external information monitoring module comprises one or a combination of a millimeter wave radar, an ultrasonic radar, a laser radar, and an external camera.

6. A system for improving safety of an occupant by a vehicle seat belt of claim 2, wherein the vehicle body posture monitoring module comprises a speed sensor, a yaw velocity sensor, and a steering wheel angle sensor,
    wherein the speed sensor is configured to monitor the vehicle body motion, and the yaw velocity sensor and the steering wheel angle sensor are configured to monitor the vehicle body posture.

7. A system for improving safety of an occupant by a vehicle seat belt of claim 2, wherein the integrated safety domain control unit comprises a modeling unit and a calculation unit, wherein the modeling unit is configured to model the obstacle based on monitoring information from the vehicle external information monitoring module, and to model the vehicle body based on monitoring information from the vehicle body posture monitoring module; and
    the calculation unit is configured to calculate the collision probability based on modeling information.

8. A system for improving safety of an occupant by a vehicle seat belt of claim 7, wherein the system further comprises a cloud database and a simulation database, wherein the cloud database is configured to provide historical data of a vehicle collision, and the simulation database is configured to provide simulation data of the vehicle collision based on the modeling information; and
    the calculation unit calculates a relative speed and a collision overlap rate between the vehicle body and the obstacle during the collision based on the historical data and the simulation data.

9. A system for improving safety of an occupant by a vehicle seat belt of claim 6, wherein the in-vehicle observation system comprises an image acquisition unit and a state capture unit, wherein the image acquisition unit is configured to acquire the in-vehicle occupant posture data, the in-vehicle seat posture data, and the in-vehicle occupant body shape data; and the state capture unit is configured to capture the in-vehicle occupant mental state data.

10. A system for improving safety of an occupant by a vehicle seat belt of claim 9, wherein the image acquisition unit is either a 3D camera or a 2D camera or a combination of a 3D camera and a 2D camera.

11. A system for improving safety of an occupant by a vehicle seat belt of claim 9, wherein the state capture unit is a camera and/or an in-vehicle radar.

12. A system for improving safety of an occupant by a vehicle seat belt of claim 9, wherein the in-vehicle occupant posture data comprises occupant torso position data and/or occupant joint position data.

13. A system for improving safety of an occupant by a vehicle seat belt of claim 9, wherein the in-vehicle seat posture data comprises either, or a combination of, seat position data and seat back angle data.

14. A system for improving safety of an occupant by a vehicle seat belt of claim 9, wherein the mental state data comprises either, or a combination of, occupant health state data and occupant facial data.

15. A system for improving safety of an occupant by a vehicle seat belt of claim 1, further comprising a collision sensor, wherein the collision sensor is configured to monitor vehicle body collision information and vehicle body collision degree information and to transmit the information to the integrated safety domain control unit, and the integrated safety domain control unit loosens the active retractor and lifts the active lift buckle based on the received information in combination with the data acquired by the in-vehicle observation system.

16. A system for improving safety of an occupant by a vehicle seat belt of claim 1, wherein the integrated safety domain control unit provides an occupant intention determination based on the data acquired by the in-vehicle observation system, and based on a result of the intention determination, the integrated safety domain control unit selectively tightens or loosens the active retractor, and/or selectively lifts or lowers the active lift buckle.

17. A method for improving safety of an occupant by a vehicle seat belt, comprising:
    providing a vehicle with an active seat belt system, which comprises an active retractor and an active lift buckle;
    acquiring in-vehicle occupant posture data and/or in-vehicle occupant body shape data and/or in-vehicle seat posture data and/or in-vehicle occupant mental state data;
    monitoring a slack state of the active retractor and a positional state of the active lift buckle; and
    formulating a vehicle seat belt protection strategy, which comprises:
    selectively tightening or loosening the active retractor based on the in-vehicle occupant posture data and/or the in-vehicle occupant body shape data and/or the in-vehicle seat posture data and the slack state and the positional state; and/or
    selectively lifting or lowering the active lift buckle based on the in-vehicle occupant posture data and/or the in-vehicle occupant body shape data and/or the in-vehicle seat posture data and the slack state and the positional state.

18. The method for improving safety of an occupant by a vehicle seat belt of claim 17, further comprising:
    monitoring an obstacle around a vehicle body;
    acquiring vehicle body motion and a vehicle body state;
    calculating a collision probability and a collision moment between the vehicle and the obstacle based on the obstacle around the vehicle body, the vehicle body motion, and the vehicle body state; and
    determining, based on the in-vehicle occupant mental state data, the collision probability, and the collision moment, whether the occupant is aware of a possibility of a collision, and if not, circularly pre-tightening and pre-loosening the active retractor, and/or circularly pre-lifting and pre-lowering the active lift buckle.

19. The method for improving safety of an occupant by a vehicle seat belt of claim 17, further comprising:
    providing an occupant intention determination based on the data acquired by an in-vehicle observation system; and
    based on a result of the occupant intention determination, selectively tightening or loosening the active retractor, and/or selectively lifting or lowering the active lift buckle.

20. A computer-readable medium, having computer instructions stored thereon, wherein when the computer instructions are executed by a processor, the steps of the method for improving safety of an occupant by a vehicle seat belt of claim 17 are implemented.

* * * * *